United States Patent Office 2,897,178
Patented July 28, 1959

2,897,178

STABILIZED POLY(ETHYLENE OXIDE)

Fred N. Hill, South Charleston, W. Va., assignor to Union Carbide Corporation, a corporation of New York No Drawing. Application May 29, 1956
Serial No. 587,953

13 Claims. (Cl. 260—45.9)

The present invention relates to stabilizers for use with ethylene oxide polymers. More particularly, this invention is concerned with the employment of alkylene oxide derivatives of ethylenediamine as stabilizers to prevent degradation in molecular weight and viscosity loss in ethylene oxide polymers.

Ethylene oxide polymers having a reduced viscosity of at least 1.0 can be prepared by a variety of processes employing a number of different catalysts, such as, for example, the alkaline earth metal derivatives of organic hydroxyl compounds (i.e., strontium methylate, calcium derivative of ethylene glycol); certain pure metal carbonates which contain about 0.1 percent sorbed water by weight of the carbonate (i.e., strontium and zinc carbonate); and the hexammoniates and amides of the group II metals.

For example, fifteen hundredths of a gram of zinc amide polymerized thirty grams of ethylene oxide in a sealed tube at 90° C. In twenty-four hours a quantitative yield of polymer of reduced viscosity 3.6 was obtained. Room temperature polymerization of ethylene oxide with 0.1 percent calcium amide catalyst gave a twenty percent conversion to polymer of reduced viscosity 61 in five days.

The polymers are useful as thickeners and binders, as well as plasticizers in adhesive composition. The polymers with viscosities greater than 30 are particularly useful as thickeners, small concentrations giving viscous solutions.

The polymers are also useful for the production of films and various molded articles.

These polymers, regardless of the process or catalyst employed in preparation, are susceptible to degradation in molecular weight. Such degradation increases with the molecular weight of the polymer, the length of aging, and increasing temperatures.

Thus the usefulness of ethylene oxide polymers in many of their applications is greatly enhanced by obtaining and maintaining a relatively high molecular weight therein (i.e., a reduced viscosity of 1.0 or higher).

Unless poly(ethylene oxide) is adequately protected against degradation, the loss in molecular weight under many use conditions can be so serious as to completely change the physical character of the material from a tough strong resin to a much less useful brittle wax. Further, stabilization of poly(ethylene oxide) becomes progressively more difficult as successively higher molecular weight grades of resin are obtained. Consequently, previous known methods and the materials for stabilizing ethylene oxide polymers of reduced viscosities substantially below one are, almost without exception, ineffective when used with a higher molecular weight grade which is the subject of this invention.

The problem is further made difficult by the variety of exposures to which the poly(ethylene oxide) resin may be put under practical operating conditions. These conditions will require, for example, that relatively dilute 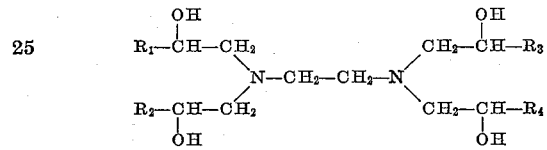 solutions of resin in water maintain their viscosity over relatively long periods of time, that solution and resin hot-melt retain their molecular weight upon exposure to high temperature, and that the resin be substantially free from degradation when subjected to thermoplastic processing operations. The problem is further complicated by the possibility that the degradation of poly(ethylene oxide) is caused by any one or a combination of several means, among them being the hydrolysis and oxidation of segments of the polymer chain.

Simple buffering of poly(ethylene oxide) solutions to maintain a low hydrogen ion concentration lessens degradation of the resin. While this may be useful under certain circumstances, in many applications a high pH is undesirable, and adequate buffering action to maintain a rather high pH will, in many instances, involve high concentrations of salt, which in itself will prove inexpedient. Further, difficulty will often occur in stabilizing dry resin by this process.

In the present invention it has been found that by incorporating small amounts of alkylene oxide derivatives of ethylenediamines of the formula $$\begin{array}{cc} \text{OH} & \text{OH} \\ | & | \\ R_1\text{—CH—CH}_2 & \text{CH}_2\text{—CH—R}_3 \\ \diagdown & \diagup \\ \text{N—CH}_2\text{—CH}_2\text{—N} & \\ \diagup & \diagdown \\ R_2\text{—CH—CH}_2 & \text{CH}_2\text{—CH—R}_4 \\ | & | \\ \text{OH} & \text{OH} \end{array}$$

wherein each of $R_1$, $R_2$, $R_3$ and $R_4$ is a hydrogen or methyl radical, into ethylene oxide polymer having a reduced viscosity of at least 1.0 and solutions and suspensions thereof, the resultant composition will be stabilized against substantial degradation when exposed to moisture, heat, relatively high hydrogen ion concentrations, oxygen and various combinations of these factors.

These stabilizers are soluble in the ethylene oxide polymer solutions and are also compatible with the solid polymer. They are colorless, very slightly odoriferous, viscous liquids and are easily soluble in water. They are simply prepared by the addition of four moles of ethylene oxide or propylene oxide to one mole of ethylenediamine.

The present invention encompasses the use of diamine derivatives such as N,N-di(2-hydroxypropyl)-N',N'-di(2-hydroxyethyl)ethylenediamine, N,N,N' - tri(2 - hydroxypropyl)-N'-(2-hydroxyethyl)ethylene, and N-(2-hydroxypropyl)-N,N',N'-tri(2 - hydroxyethyl)ethylenediamine as stabilizers in addition to those disclosed in the following examples, i.e., the symmetrical compounds containing four 2-hydroxyethyl or 2-hydroxypropyl groups.

The ethylenediamine derivatives of the present invention provide stabilization of poly(ethylene oxide) without substantial alteration in its physical properties, as, for example, without discoloration on aging or exposure to light and heat; at the same time the stabilizer itself is stable and non-toxic, and is not easily extracted from the resin into which it has been incorporated, nor does it contribute to the opacity of the latter.

It has been found that there is an optimum concentration of the stabilizers of this invention, when incorporated into ethylene oxide polymers. Thus 2 percent to 5 percent by weight of the polymer of stabilizer constitutes a preferred range, while as little as 0.5 percent of stabilizer by weight of the polymer, particularly where the polymer is of a reduced viscosity of approximately one, is wholly operative. On the other hand, concentrations in excess of 5 percent offer only slight improvement in terms of stabilizing performances contrasted to the optimum range. These stabilizers are most advantageously employed with ethylene oxide polymers having, as has been noted previously, a reduced viscosity of 1.0 or higher and melting point of 65±2° C. as determined by stiffness-temperature measurements.

As the term is used throughout this specification, reduced viscosity of a polymer is regarded as a measure of its molecular weight. The reduced viscosity of a solution of a polymer at a given temperature is obtained by dividing the specific viscosity by the concentration of the polymer in the solution measured in grams of polymer per hundred milliliters of the solvent. The specific viscosity is obtained by dividing the difference between the viscosity of the solution and the viscosity of the pure solvent by the viscosity of the solvent. The reduced viscosities of the ethylene oxide polymers referred to herein were measured at 30° C. in acetonitrile at a concentration of 0.2 gram per hundred milliliters of solvent.

The method by which these stabilizers are incorporated into the ethylene oxide resins is not critical, and any of a variety of means of insuring thorough incorporation may be used. One of the most efficient of these involves admixture of the stabilizer with the resin at the time the latter is formed. Another method advantageously employed comprises introducing the stabilizer into a resin suspension, and bringing the stabilizer into intimate contact with the dispersed polymer by evaporating off the diluent. Suitable non-solvent diluents are, for example, saturated aliphatic ethers, ketones, saturated aliphatic hydrocarbons, higher molecular weight saturated alcohols and saturated aliphatic esters (i.e., dibutyl ether, diethyl ether, dioxane, acetone, methyl ethyl ketone, hexane, cyclohexane, heptane, butanol, ethyl acetate). Other methods include mixing the stabilizer with the molten resin; dissolving the stabilizer in resin solutions employing solvent diluents therefore, for example, methanol, acetic acid, acetonitrile, benzene and water, preferably dilute aqueous solutions; or incorporation on a two-roll mill, extruder, Banbury mixer, or similar device. The stabilizers are effective in diluents regardless of the concentration of polymer.

While I do not wish to be bound by any particular theory, the effectivness of these compounds as stabilizers does not appear to be a function of their slightly basic nature, for similar compounds of greater and lesser basicity are not effective; nor does the action seem to be centered around complexing of the residual catalyst in that the efficiency of the stabilizer is independent of the catalyst content of the polymer. It appears rather that the stabilizers of the present invention act as antioxidants, terminating a chain mechanism of molecular degradation.

The following examples will be further illustrative of the invention, but are not to be construed as limiting its scope.

EXAMPLE 1

A sample of unstabilized poly(ethylene oxide) with reduced viscosity of 8.5 was dissolved in water to prepare a 0.2 percent solution. This process was carried out on a roll-mill at room temperature and degradation was negligible. Portions of this stock solution where then used to prepare individual test bottles. To all except one 200 milliliter portion of this solution, which excepted sample served as a control, were added 10 milligram samples of the antioxidants enumerated below. The solutions were then maintained at 100° C. for 24 hours and the viscosities of the various samples were redetermined by means of a Cannon-Fenske-Ostwald type viscometer. The time of efflux for the stock solution (A), the protected heated sample (B), and the unprotected heated sample (C), and the solvent efflux time (D) were recorded, and the extent of degradation as measured by the viscosity loss is calculated simply as follows:

$$\text{Percent degradation} = 100\left(1 - \frac{B-D}{A-D}\right) = \frac{A-B}{A-D} \times 100$$

and in a similar fashion the degradation of the unprotected heated sample is:

$$\text{Percent degradation} = 100\left(1 - \frac{C-D}{A-D}\right) = \frac{A-C}{A-D} \times 100$$

This method of determination was employed in the several examples disclosed herein.

Table I

| Sample | No Stabilizer | N,N,N',N'-tetrakis (2-hydroxypropyl)-ethylenediamine |
| --- | --- | --- |
| Original Efflux Time (sec.) | 120.6 (A) | 120.6 (A) |
| Final Efflux Time (sec.) | 47.8 (C) | 111.8 (B) |
| Solvent Efflux Time (sec.) | 44.8 (D) | 44.8 (D) |
| Percent Degradation | 96.0 | 11.6 |

The striking effectiveness of N,N,N',N'-tetrakis(2-hydroxypropyl)ethylenediamine as shown in Table I was found to be quite different from the protection afforded by a number of conventional antioxidants tested in the same manner. It is not known beyond doubt what the mechanism of the degradation is, but various experiments have shown the polymer to be more stable in nearly oxygen-free systems. No effort to exclude oxygen from the test bottles or the stock solution was made and oxygen was free to enter the bottles which were sampled intermittently over longer periods. The above experimental bottles, excepting the control, were heated an additional twenty-four hours at 100° C. and only 3.5 percent additional degradation was observed.

Antioxidants tested for comparison were phenyl ethyl ethanolamine, p-phenyl phenol, dimethylhexynol, hydroquinone diethyl ether, diphenyl thiocarbazone, zinc dibutyl dithio carbamate, p-anilinophenol and others. None of these compounds was effective to a practical extent, degradation of polymer being over 75 percent under the usual 100° C.–24 hour test conditions.

EXAMPLE 2

A 0.2 percent solution of poly(ethylene oxide) polymer (reduced viscosity 7.3) was prepared as in Example 1 and 10 mg. of N,N,N',N'-tetrakis(2-hydroxyethyl)ethylenediamine was added to 200 cc. of the polymer solution. The samples were heated to 100° C. for twenty-four hours and the data recorded as before. The results were as indicated in Table II.

Table II

| Sample | No Stabilizer | Stabilized |
| --- | --- | --- |
| Original Efflux Time (sec.) | 110.2 (A) | 110.2 (A) |
| Final Efflux Time (sec.) | 46.8 (C) | 104.4 (B) |
| Solvent Efflux Time (sec.) | 44.8 (D) | 44.8 (D) |
| Percent Degradation | 97.0 | 8.9 |

EXAMPLE 3

A 0.2 percent solution of ethylene oxide polymer (reduced viscosity about 13) in water was prepared as in previous examples. N,N,N',N'-tetrakis(2-hydroxypropyl)ethylenediamine was added to individual samples to the extent of 0.5 percent, 1.0 percent and 2.0 percent (based on the polymer weights). The results are recorded in the following table.

Table III

| Sample | 0.5% | 1.0% | 2.0% |
| --- | --- | --- | --- |
| Original Efflux Time (sec.) (A) | 220 | 220 | 220 |
| After 168 hours at 70° (B) | 46.6 | 209.4 | 207.4 |
| After 312 hours at 70° (B) | 46.2 | 191.8 | 192.6 |
| After 480 hours at 70° (B) | 46.0 | 173.4 | 175.0 |
| After 624 hours at 70° (B) | 46.0 | 160.0 | 175.0 |
| Solvent Efflux Time (D) | 44.8 | 44.8 | 44.8 |
| Percent Degradation at 168 hours | 99 | 6.1 | 7.7 |
| Percent Degradation at 480 hours | 99.5 | 26.6 | 25.3 |
| Percent Degradation at 624 hours | 99.5 | 34.2 | 25.6 |

To demonstrate further the unique stabilizing character of the ethylenediamine derivatives of the present invention the ethylene oxide derivative of ammonia, namely triethanolamine, was tested and found to allow a degradation of 30 percent under the conditions and according to the practice described in Examples 1 and 2 above, as compared with the 10 percent degradation permitted by the ethylenediamine derivatives disclosed herein, tested under the same conditions. The derivative of the next member of the polyethylene amine series, namely penta(2-hydroxyethyl)diethylenetriamine, was found to provide even less effective stability than triethanolamine under the same test conditions.

Other similar compounds tested imparted to the ethylene oxide solution an insignificant degree of stability or none at all. These included tetraethanolammonium hydroxide, phenyl ethyl ethanolamine, N-phenyl diethanolamine, polyacrylamide, triethylamine, tetraethyl ethylenediamine, dimethyl ethanolamine, monoethanolamine, triisopropanolamine, diethanolamine, and ethylenediamine tetra-acetic acid.

EXAMPLE IV

An ethylene oxide polymer (reduced viscosity of 7.35), to which one percent of N,N,N',N'-tetrakis(2-hydroxypropyl)ethylenediamine by weight of said polymer was added, was heated in air for twenty minutes at 150° C. The reduced viscosity of the ethylene oxide resin at the end of this period was 2.75 or a molecular degradation of 62 percent. A control sample of ethylene oxide polymer similarly treated evidenced a molecular degradation of 80.8 percent.

I claim:

1. A composition comprising poly(ethylene oxide) having a reduced viscosity of at least 1.0 as measured at a concentration of 0.2 gram of said poly(ethylene oxide) in 100 milliliters of acetonitrile at 30° C., and as a stabilizer therefor a compound of the formula:

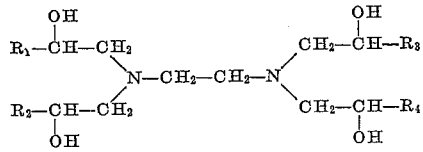

wherein each of $R_1$, $R_2$, $R_3$ and $R_4$ is a member selected from the group consisting of hydrogen and methyl.

2. A composition comprising poly(ethylene oxide) having a reduced viscosity of at least 1.0 as measured at a concentration of 0.2 gram of said poly(ethylene oxide) in 100 milliliters of acetonitrile at 30° C., and N,N,N',N' - tetrakis(2 - hydroxypropyl)ethylenediamine as a stabilizer therefor.

3. A composition comprising poly(ethylene oxide) having a reduced viscosity of at least 1.0 as measured at a concentration of 0.2 gram of said poly(ethylene oxide) in 100 milliliters of acetonitrile at 30° C., and N,N,N',N'-tetrakis(2-hydroxyethyl)ethylenediamine as a stabilizer therefor.

4. A composition comprising poly(ethylene oxide) having a reduced viscosity of at least 1.0 as measured at a concentration of 0.2 gram of said poly(ethylene oxide) in 100 milliliters of acetonitrile at 30° C., and as a stabilizer therefor 2 percent to 5 percent by weight of said homopolymer of a compound of the formula:

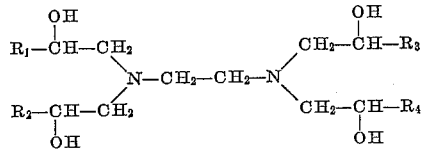

wherein each of $R_1$, $R_2$, $R_3$ and $R_4$ is a member selected from the group consisting of hydrogen and methyl.

5. A composition comprising poly(ethylene oxide) having a reduced viscosity of at least 1.0 as measured at a concentration of 0.2 gram of said poly(ethylene oxide) in 100 milliliters of acetonitrile at 30° C., and 2 percent to 5 percent by weight of said homopolymer of N,N,N',N'-tetrakis(2-hydroxypropyl)ethylenediamine as a stabilizer therefor.

6. A composition comprising poly(ethylene oxide) having a reduced viscosity of at least 1.0 as measured at a concentration of 0.2 gram of said poly(ethylene oxide) in 100 milliliters of acetonitrile at 30° C., and 2 percent to 5 percent by weight of said homopolymer of N,N,N',N'-tetrakis(2-hydroxyethyl)ethylenediamine as a stabilizer therefor.

7. A composition comprising poly(ethylene oxide) having a reduced viscosity of at least 1.0 as measured at a concentration of 0.2 gram of said poly(ethylene oxide) in 100 milliliters of acetonitrile at 30° C., a diluent, and as a stabilizer therefor 2 percent to 5 percent by weight of said homopolymer of a compound of the formula:

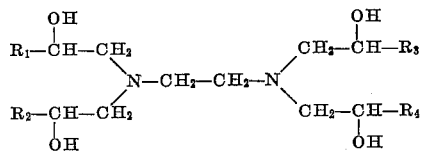

wherein each of $R_1$, $R_2$, $R_3$ and $R_4$ is a member selected from the group consisting of hydrogen and methyl.

8. A composition comprising an aqueous solution of poly(ethylene oxide), said polymer having a reduced viscosity of at least 1.0 as measured at a concentration of 0.2 gram of said poly(ethylene oxide) in 100 milliliters of acetonitrile at 30° C., and as a stabilizer therefor 2 percent to 5 percent by weight of said poly(ethylene oxide) of the compound of the formula:

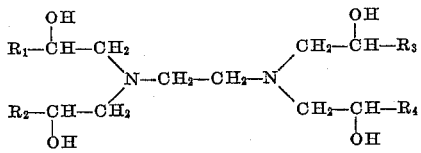

wherein each of $R_1$, $R_2$, $R_3$ and $R_4$ is a member selected from the group consisting of hydrogen and methyl.

9. A method of stabilizing poly(ethylene oxide) having a reduced viscosity of at least 1.0 as measured at a concentration of 0.2 gram of said poly(ethylene oxide) in 100 milliliters of acetonitrile at 30° C. which comprises adding thereto a compound of the formula:

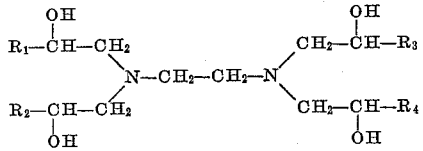

wherein each of $R_1$, $R_2$, $R_3$ and $R_4$ is a member selected from the group consisting of hydrogen and methyl.

10. A method of stabilizing poly(ethylene oxide) having a reduced viscosity of at least 1.0 as measured at a concentration of 0.2 gram of said poly(ethylene oxide) in 100 milliliters of acetonitrile at 30° C. which comprises admixing with said homopolymer a compound of the formula:

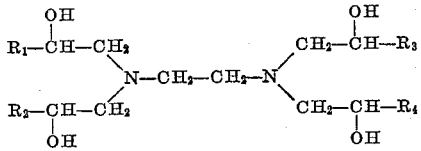

wherein each of $R_1$, $R_2$, $R_3$ and $R_4$ is a member selected from the group consisting of hydrogen and methyl, at the time said polymer is formed.

11. A method of stabilizing poly(ethylene oxide) having a reduced viscosity of at least 1.0 as measured at a concentration of 0.2 gram of said poly(ethylene oxide) in 100 milliters of acetonitrile at 30° C. which comprises forming a resin suspension of said ethylene oxide polymer in a diluent, introducing therein a stabilizer of the formula:

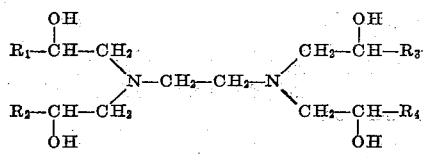

wherein each of $R_1$, $R_2$, $R_3$ and $R_4$ is a member selected from the group consisting of hydrogen and methyl, and evaporating said diluent from said suspension to cause a deposition of said stabilizer on said poly(ethylene oxide).

12. A method of stabilizing poly(ethylene oxide) having a reduced viscosity of at least 1.0 as measured at a concentration of 0.2 gram of said poly(ethylene oxide) in 100 milliliters of acetonitrile at 30° C. which comprises adding thereto N,N,N',N' - tetrakis(2 - hydroxypropyl)ethylenediamine.

13. A method of stabilizing poly(ethylene oxide) having a reduced viscosity of at least 1.0 as measured at a concentration of 0.2 gram of said poly(ethylene oxide) in 100 milliliters of acetonitrile at 30° C. which comprises adding thereto N,N,N',N' - tetrakis(2 - hydroxyethyl)ethylenediamine.

References Cited in the file of this patent
UNITED STATES PATENTS

| | | |
|---|---|---|
| 2,697,118 | Lundsted et al. | Dec. 14, 1954 |
| 2,706,189 | Pruitt et al. | Apr. 12, 1955 |
| 2,723,241 | De Groote | Nov. 8, 1955 |